455-4 VJ 233 EX

5T98102 OR 4,007,424

4055|4 [redacted]

United States Patent [19]

Gargini

[11] 4,007,424

[45] Feb. 8, 1977

[54] TRANSISTOR SWITCHES FOR SELECTING PROGRAM SIGNALS IN A WIRED BROADCASTING SYSTEM

[75] Inventor: Eric John Gargini, West Drayton, England

[73] Assignee: Communications Patents Limited, London, England

[22] Filed: Sept. 17, 1975

[21] Appl. No.: 613,980

[30] Foreign Application Priority Data

Sept. 21, 1974 United Kingdom ............. 41195/74
Oct. 30, 1974 United Kingdom ............. 47066/74

[52] U.S. Cl. ........................ 325/309; 178/DIG. 13; 179/1 B; 325/393; 325/394

[51] Int. Cl.² ........................................ H04N 7/10

[58] Field of Search .......... 325/308, 309, 393, 394; 179/1 B, 2 A; 178/DIG. 13; 317/135 R, 135 A, 137, 138, 148.5 R; 335/138

[56] References Cited

UNITED STATES PATENTS

| | | | |
|---|---|---|---|
| 2,205,272 | 6/1940 | Powell | 325/394 |
| 2,226,692 | 12/1940 | Brunner | 325/393 |
| 3,244,809 | 4/1966 | Fuller et al. | 325/308 |
| 3,566,020 | 2/1971 | Kinross | 325/308 |
| 3,920,906 | 11/1975 | Gargini | 179/1 B |

OTHER PUBLICATIONS

Gabriel R. P., Dial A Program, Proc. IEEE, vol. 58, No. 7, July 1970.

*Primary Examiner*—Robert L. Griffin
*Assistant Examiner*—Jin F. Ng
*Attorney, Agent, or Firm*—Laurence R. Brown

[57] ABSTRACT

A wired broadcasting system is described which comprises a plurality of program signal sources, and a switch for making a connection between a signal cable extending to a subscriber and any desired one of said program signal sources. The switch comprises a plurality of electro-magnetically operable contacts connected between respective ones of the signal sources and the signal cable, an operating coil in respect of each contact, and a semiconductor switch in respect of each operating coil. The subscriber controls the semiconductor switches to close any one of the contacts and thereby select a program signal source. Each of the program signal sources provides a voltage signal which, once that program signal source has been selected, is applied to the respective semi-conductor switch so as to maintain the selection.

5 Claims, 1 Drawing Figure

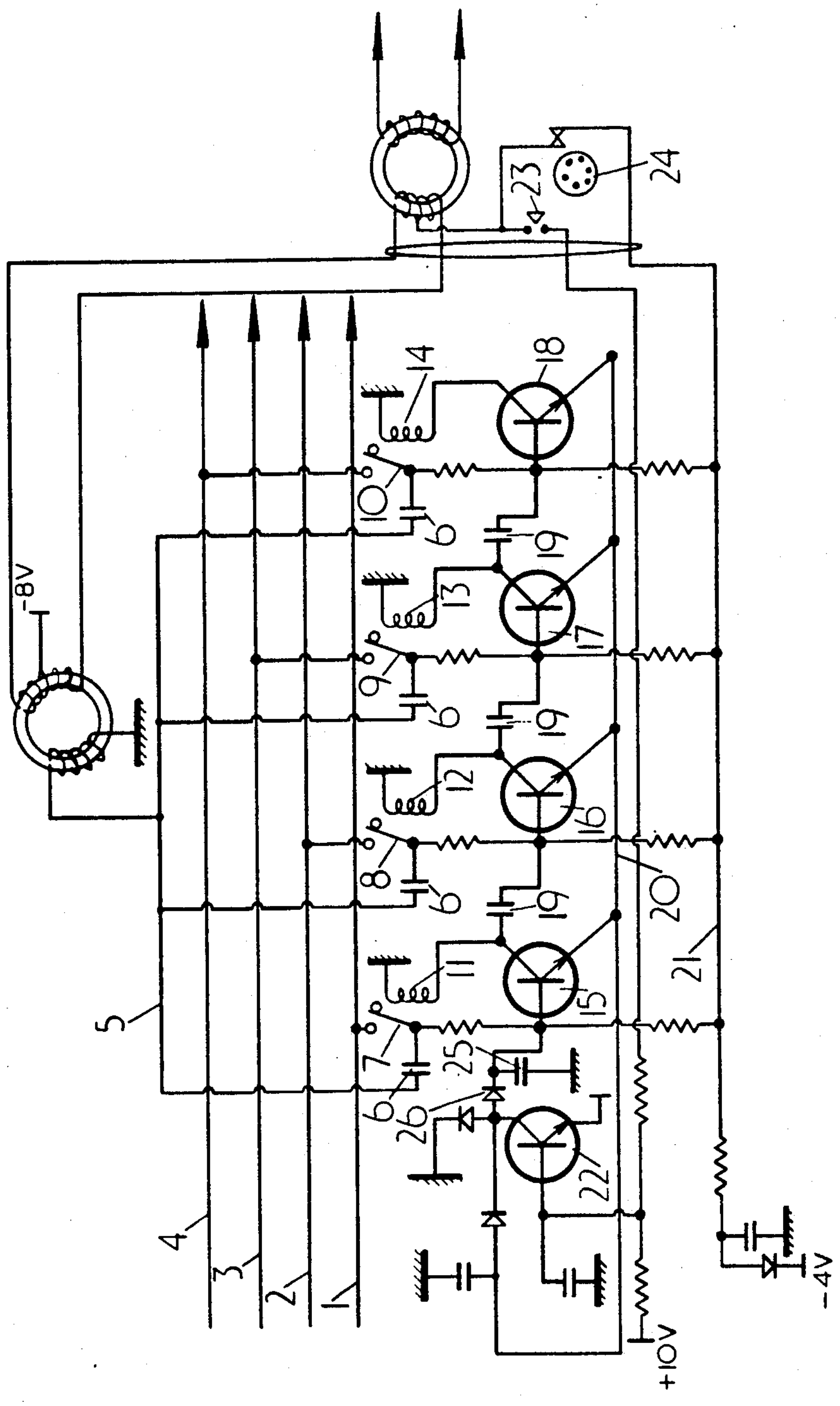
-8V
+10V
-4V
1
2
3
4
5
6
7
8
9
10
11
12
13
14
15
16
17
18
19
20
21
22
23
24
25
26

TRANSISTOR SWITCHES FOR SELECTING PROGRAM SIGNALS IN A WIRED BROADCASTING SYSTEM

The present invention relates to wired broadcasting systems, and in particular to such systems in which switch means are provided for connecting a subscriber to a desired one of a plurality of programme signal sources provided at a programme exchange to which the subscriber is connected by a signal cable.

It is an object of the invention to provide improved switch means.

According to the present invention there is provided a wired broadcasting system comprising a plurality of programme signal sources, and switch means for making a connection between a signal cable extending to a subscriber and any desired one of said programme signal sources, the switch means comprising a plurality of electro-magnetically operable contacts connected between respective ones of the signal sources and the signal cable, an operating coil in respect of each contact, and a semi-conductor switch in respect of each operating coil, the subscriber being provided with means for controlling the semi-conductor switches to close any one of the contacts and thereby select a programme signal source, and each of the programme signal sources providing a voltage signal which, once that programme signal source has been selected, is applied to the respective semi-conductor switch to maintain the selection.

Preferably, the semi-conductor switches of each subscriber comprise a series of transistors. The base of each transistor in the series is connected to a respective set of contacts and the transistor is arranged such that the respective contacts are closed by its conduction and, once the contacts are closed, the said voltage signal maintains the transistor in its conductive state. Adjacent transistors in the series may be connected by capacitive circuits such that when any transistor in the series is turned off the capacitive circuit connecting it to a subsequent transistor in the series is charged, the charge on the capacitive circuit causing the said subsequent transistor to conduct. The first transistor in the series may be connected to a reset circuit controllable by the subscriber to turn off any conducting transistor in the series and thereafter to turn on the said first transistor.

The reset circuit may comprise a normally conducting transistor which when conducting provides a bias to each of the transistors in the series which enables the transistors to conduct, the subscriber being provided with a switch actuation of which turns off the normally conducting transistor to remove the said bias and turn off any transistor in the series which is conducting. The normally conducting transistor may be connected to the first transistor in the series by a capacitive circuit which is charged when the normally conducting transistor is turned off and thereafter operates to turn on the first transistor in the series.

Each transistor in the series may be connected to a dial unit operable by the subscriber to apply pulses thereto, each pulse turning off any conducting transistor in the series and thereby turning on the subsequent transistor in the series.

An embodiment of the present invention will now be described, by way of example, with reference to the accompanying drawing. The drawing shows switch means for controlling the selection by a subscriber of four programme signals only, but it will be appreciated that more or less than four programme signals may be accommodated by suitable expansion or contraction of the system.

In the drawing, four bus bars 1, 2, 3 and 4 are provided, each carrying a respective programme signal and a 10 volt positive D.C. voltage. Bus bar 1 corresponds to channel "0" whereas bus bars 2, 3, 4 correspond to channels "1", "2" and "3". The programme on channel "0" may be for example a picture listing what programmes are available on the other channels. The bus bars may be connected to an output line 5 via H.F. coupling capacitors 6 by contacts 7, 8, 9, and 10 which are controlled by operating coils 11, 12, 13 and 14 respectively. The output line 5 is connected to the subscribers receiving equipment via suitable baluns as shown which are also used to provide a phantom-8 volt supply to the subscribers selector equipment. The operating coils may be energized to close the respective contacts by transistors 15, 16, 17 and 18 that are connected in a sequence by pulse coupling capacitors 19. The transistors 15, 16, 17 and 18 are biased by potentials applied to lines 20 and 21, the line 20 normally being maintained at −2 volts by conduction of a transistor 22, and the line 21 normally being maintained at −4 volts. The transistor 22 and lines 21 are connected by a signal conductor pair to a reset button 23 and a dial unit 24 respectively provided in the subscribers equipment. The reset button 23 and dial unit 24 are supplied with the −8 volt potential from the baluns, so that depression of the button 23 drops the base potential of transistor 22 from 10 volts positive to 8 volts negative, turning off transistor 22, and actuation of the dial unit 24 applies −8 volt pulses to the line 21. Transistor 15, which is the first in the sequence, is connected by a capacitor 25 and a diode 26 to the collector of transistor 22.

In use, when the subscriber wishes to select a programme, he actuates reset switch 23, thereby turning off transistor 22. A positive going pulse is thus applied to the capacitor 25 and the line 20, turning off any of transistors 15, 16, 17, 18 which were is their conductive states and ensuring that contacts 7, 8, 9, 10 are open. At the end of the reset operation the charged capacitor 25 turns on transistor 15 so that coil 11 is energised and contacts 7 close. The 10 volt positive voltage on bus bar 1 maintains the transistor 15 conductive when the potential on line 20 returns to −2 volts after release of the button 23, and the channel "0" programme on bus bar 1 is thus selected.

If the subscriber wishes to receive the channel "1" programme on bus bar 2, he actuates dial unit 24 to apply one 8 volt negative pulse to line 21. This negative pulse turns off transistor 15 and a positive pulse is as a result applied via capacitor 19 to the base of transistor 16, turning it on and energising coil 12 to close contacts 8. The 10 volt positive voltage on bus bar 2 maintains the transistor 16 conductive, and the selected H.F. signal is applied to the line 5 via capacitor 6. if the subscriber had wished to view the programme on bus bar 3, the necessary selection could have been made by applying two pulses to the line 20 so that transistors 15 and 16 could be turned off successively, leaving transistor 17 in its conductive state. If whilst viewing the programme on bus bar 2 the subscriber wished to switch to the programme on bus bar 4 for example, the selection could be made either by applying two pulses to the line 20, or by resetting and applying three pulses to the line 20.

It will be appreciated that the transistors could be arranged in a monolithic array. For example the transistors 15, 16, 17, 18 could be provided by a transistor array having common emitters.

What is claimed is:

1. A wired broadcasting system comprising a plurality of programme signal sources, and switch means for making a connection between a signal cable extending to a subscriber and any desired one of said programme signal sources, the switch means comprising a plurality of electro-magnetically operable contacts connected between respective ones of the signal sources and the signal cable, an operating coil in respect of each contact, and a semi-conductor switch in respect of each operating coil comprising a series of transistors with bases, the subscriber being provided with means for controlling the semi-conductor switches to close any one of the contacts and thereby select a programme signal source, each of the programme signal sources providing a voltage signal which, once that programme signal source has been selected, is applied to the respective semi-conductor switch so as to maintain the selection wherein the base of each transistor in the series is connected to a respective operating coil and the transistor has a circuit arranged such that the respective contacts are closed by its conduction and, once the contacts are closed, the said voltage signal maintains the transistor in its conductive state wherein adjacent transistors in the series are connected by capacitive circuits such that when any transistor in the series is turned off the capacitive circuit connecting it to a subsequent transistor in the series is charged, the charge on the capacitive circuit causing the said subsequent transistor to conduct.

2. A wired broadcasting system according to claim 1, wherein each transistor in the series is connected to a dial unit operable by the subscriber to apply pulses thereto, each pulse turning off any conducting transistor in the series and thereby turning on the subsequent transistor in the series.

3. A wired broadcasting system according to claim 1, wherein the first transistor in the series is connected to a reset circuit controllable by the subscriber to turn off any conducting transistor in the series and thereafter to turn on the said first transistor.

4. A wired broadcasting system according to claim 3, wherein the reset circuit comprises a normally conducting transistor which when conducting provides a bias to each of the transistors in the series which enables the transistors to conduct, the subscriber being provided with a switch actuation of which turns off the normally conducting transistor to remove the said bias and turn off any transistor in the series which is conducting.

5. A wired broadcasting system according to claim 4, wherein the said normally conducting transistor is connected to the first transistor in the series by a capacitive circuit which is charged when the normally conducting transistor is turned off and thereafter operates to turn on the first transistor in the series.

* * * * *